March 7, 1961 — R. K. GASKILL — 2,973,590
FOOT GUARD
Filed Nov. 2, 1959
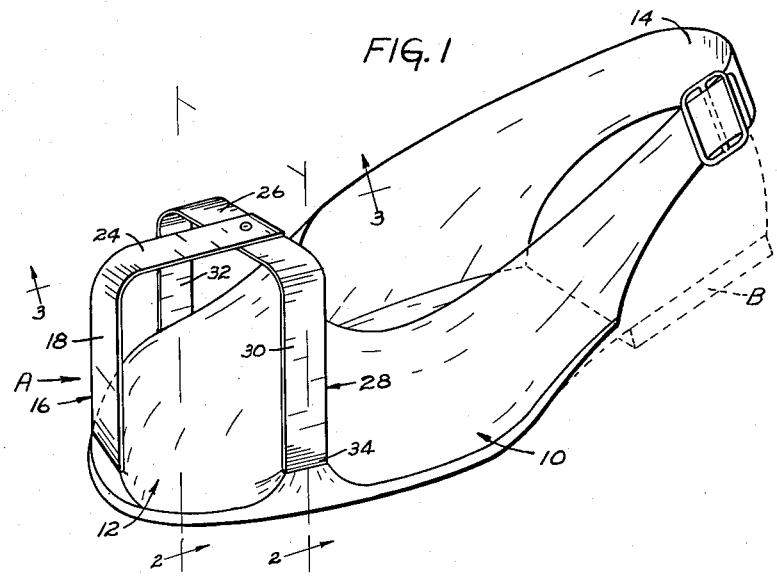
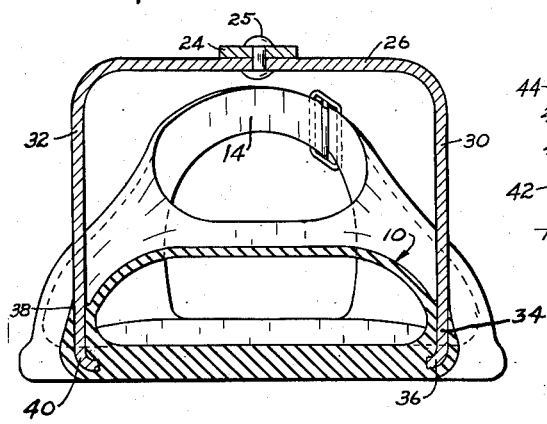
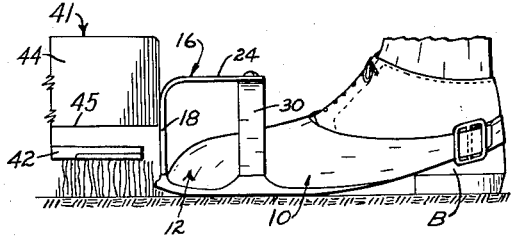
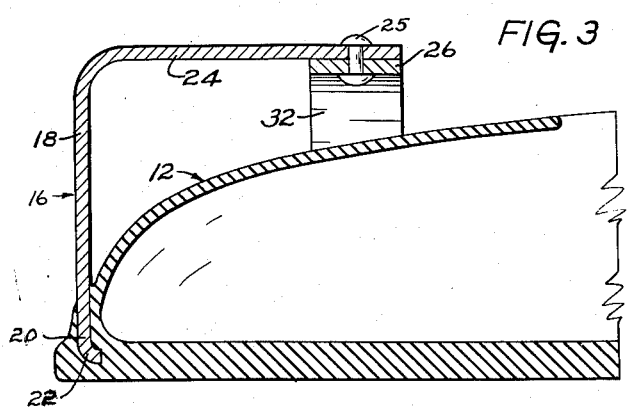
INVENTOR.
ROBERT K. GASKILL
BY Jack W. Hicks
ATTORNEY

2,973,590
FOOT GUARD

Robert K. Gaskill, Rte. 5, Box 220, Duluth, Minn.

Filed Nov. 2, 1959, Ser. No. 850,242

1 Claim. (Cl. 36—72)

My invention relates broadly to an improvement in safety devices, more particularly to a device for protection of the foot, and in detail to a device which substantially prevents contact of the operator's foot with the blade of a lawn mower particularly of the so-called "rotary" type.

With the advent of the "rotary" type of lawn mower having a horizontally disposed rotating blade a machine having dangerous propensities was put in the hands of millions of home owners who use the mowers under many different conditions and in various ways. The danger inherent in this type of mower is that the blade may be contacted by the foot by inadvertently placing the foot under a portion of the edge of the casing covering the blade or the blade may be contacted by a partial entrance of the foot into the discharge chute formed in the casing. Further the mower may be caused to move upon the foot. In any event, contact with the blade results in a badly mangled foot.

It is an object of my invention to provide a guard for the foot which may be slipped on the shoe and which prevents contact with the blade of a mower by prohibiting placement of the foot either by a forward or sideward movement under the casing or into the discharge chute of the mower particularly desirable for use by users of the mower who have not acquired adult status. The purpose of the guard is not to withstand contact with the mower blade but to prohibit entrance of the foot into the area covered by the blade whether the foot be moved forwardly or sidewardly.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of example a preferred embodiment of the invention idea wherein like numerals refer to like parts throughout.

In the drawings forming part of this application:

Figure 1 is a perspective view of a foot guard made according to the teaching of my invention with the heel of a shoe shown in broken lines.

Figure 2 is a sectional view on the line 2—2 of Figure 1.

Figure 3 is a sectional view on the line 3—3 of Figure 1.

Figure 4 is a side elevational view of my device on a shoe with a portion of the mower and blade thereof shown.

For the purpose of illustrating the invention a portion of a rotary mower 41 has been shown in the drawing which has a horizontal rotating blade 42 and a case 44 disposed thereabove and having its lower edge 45 disposed thereabove adjacent the blade 42 and above the ground to allow the grass to be cut.

Referring to the drawings in detail my foot guard A includes the slip-on shoe-like member 10, the toe portion 12 of which is engaged upon the fore part or toe of the shoe B with the band portion 14 thereof engaging the heel of the shoe. Constructed at the front or toe portion of the member 10 is an upstanding guard member 16 which includes the vertical front guard portion 18. The lower end 20 of the vertical front guard portion 18 is formed with a flange 22 and is molded into the sole of the slip-on member at the front thereof. The upper end of the vertical front portion 18 terminates in the right angular rearwardly extending horizontal top portion 24. The outer rear end of the top portion 24 is connected by means of the rivet 25 to the center of the base portion 26 of the inverted U-shaped brace 28. The base portion 26 includes the depending leg or side guard portions 30 and 32, and the lower end 34 of the guard portion 30 is formed with a flange 36 which is molded into the side and sole of the slip-on member 10.

The lower end 38 of the side guard portion 32 is formed with a flange 40 which is molded into the side and sole of the slip-on member 10. The guard 16 is thus positioned so that the front or bumper portion 18 is at the extreme fore part of the foot guard A and the foot so that entry of the foot by forward motion into the area of the blade is prohibited when the same is used. The side portions 30 and 32 prevent entry of the foot in a sideward fashion under the casing of the mower or into the discharge chute. Further the vertical front portion 18 and the side guard portions 30 and 32 are of a height which is approximately one and one-half times the height of the toe of the slip-on 10 thus placing the uppermost extend of the guard 16 in considerably spaced relation with respect to the top of the toe portion of the slip-on and the foot and shoe within it.

It will be noted in Figure 4 how the guard 16 prevents the toe of the shoe B from contacting the blade 42 under the mower from a forward movement of the shoe. The possibility of the blade 42 striking the foot of the operator without my device is even greater at the point of the grass discharge chute of the mower, but with my guard this danger is done away with. If the operator moves a foot in either sideward direction the guard portions 30 and 32 prevent entry of the foot into the area swept by the mower blade.

The invention is not to be understood as restricted to the details set forth since these may be modified within the scope of the appended claim without departing from the spirit and scope of the invention.

Having thus described the invention, what I claim as new and desire to secure by Letters Patent is:

In combination with a slip-on shoe, a foot guard comprising a vertical front portion having a horizontal portion extending rearwardly from the upper end of said front portion, an inverted U-shaped portion connected to the rear end of said horizontal portion of said front portion, the lower free end of said front portion connected to the extreme forward portion of the toe of the slip-on shoe, the lower free ends of said U-shaped portion connected to said slip-on shoe adjacent the front end thereof and spaced from the lower end of said vertical front portion, the height of said vertical front portion and said U-shaped portion being sufficient to contact the lower edge of the casing of a rotary lawn mower to prevent placement of the foot of the operator under the casing and in contact with the horizontal rotating blade of the mower.

References Cited in the file of this patent

UNITED STATES PATENTS

| | | |
|---|---|---|
| 900,499 | Eckhard | Oct. 6, 1908 |
| 1,872,025 | Baynard et al. | Aug. 16, 1932 |
| 1,954,569 | League | Apr. 10, 1934 |
| 2,393,810 | Purinton | Jan. 29, 1946 |
| 2,804,700 | Haltkamp et al. | Sept. 3, 1957 |
| 2,807,098 | Wunker | Sept. 24, 1957 |